(12) United States Patent
Faulk, Jr.

(10) Patent No.: US 7,623,518 B2
(45) Date of Patent: Nov. 24, 2009

(54) DYNAMIC ACCESS CONTROL LISTS

(75) Inventor: Robert L. Faulk, Jr., Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 952 days.

(21) Appl. No.: 10/822,048

(22) Filed: Apr. 8, 2004

(65) Prior Publication Data

US 2005/0259654 A1 Nov. 24, 2005

(51) Int. Cl.
*H04L 12/28* (2006.01)
*G06F 15/173* (2006.01)
*H04L 29/06* (2006.01)

(52) U.S. Cl. .................. 370/392; 370/352; 370/391; 370/396; 370/401; 370/431; 709/225; 709/232; 709/250; 713/152

(58) Field of Classification Search ......... 370/352–431; 709/225–250, 152
See application file for complete search history.

(56) References Cited

U.S. PATENT DOCUMENTS

| | | | |
|---|---|---|---|
| 6,219,706 B1 * | 4/2001 | Fan et al. ............. | 709/225 |
| 6,345,294 B1 * | 2/2002 | O'Toole et al. ........ | 709/222 |
| 6,463,474 B1 * | 10/2002 | Fuh et al. ............. | 709/225 |
| 6,697,330 B1 * | 2/2004 | Melvin et al. ......... | 370/235 |
| 6,757,723 B1 * | 6/2004 | O'Toole et al. ........ | 709/222 |
| 6,957,276 B1 * | 10/2005 | Bahl ................... | 709/245 |
| 6,973,488 B1 * | 12/2005 | Yavatkar et al. ....... | 709/223 |
| 7,143,435 B1 * | 11/2006 | Droms et al. .......... | 726/3 |
| 7,249,175 B1 * | 7/2007 | Donaldson ............. | 709/225 |
| 7,249,374 B1 * | 7/2007 | Lear et al. ............ | 726/6 |
| 2003/0088520 A1 * | 5/2003 | Bohrer et al. ......... | 705/74 |
| 2004/0123150 A1 * | 6/2004 | Wright et al. ......... | 713/201 |
| 2004/0193918 A1 * | 9/2004 | Green et al. .......... | 713/201 |
| 2005/0055578 A1 * | 3/2005 | Wright et al. ......... | 713/201 |
| 2006/0005254 A1 * | 1/2006 | Ross .................. | 726/27 |
| 2006/0052085 A1 * | 3/2006 | Gregrio Rodriguez et al. ................. | 455/411 |
| 2006/0059348 A1 * | 3/2006 | Girard et al. ......... | 713/176 |
| 2007/0183416 A1 * | 8/2007 | Gooch et al. .......... | 370/389 |
| 2007/0211626 A1 * | 9/2007 | Gooch et al. .......... | 370/229 |

* cited by examiner

*Primary Examiner*—Ayaz R Sheikh
*Assistant Examiner*—Venkatesh Haliyur

(57) ABSTRACT

A method controls access of a user to a network including a plurality of hosts coupled together through a network switch. The method includes storing in the network switch an enhanced access control list containing data related to at least one of user names, DNS names, domain names, and physical addresses. A dynamic access control list is generated from the enhanced access control list, with the dynamic access control list containing a plurality of IP addresses that restrict access of the user to the network.

22 Claims, 3 Drawing Sheets

DYNAMIC ACCESS CONTROL LISTS

BACKGROUND OF THE INVENTION

In an Ethernet local area network (LAN), computers or hosts are attached to the network and each host is uniquely identified by a physical address which is designated a media access control (MAC) address in an Ethernet network. The MAC address of each host is typically hardwired into an Ethernet network interface card in the host. The network interface card in each host transmits and receives Ethernet packets to communicate with the other hosts in the network. Each Ethernet packet includes an address segment including the MAC address of the host to receive the packet (destination MAC address) along with the MAC address of the host sending the packet (source MAC address), and further includes a data segment, as will be understood by those skilled in the art. The MAC address of each host is utilized by Ethernet switches in the network to receive and forward Ethernet packets between hosts. More specifically, a switch receives an Ethernet packet from a source host, examines the destination MAC address portion of the packet to determine where to forward the packet, and forwards the packet to the host corresponding to the destination MAC address.

In many situations, an Ethernet network must communicate with hosts outside the network and in different types of networks. For example, a user of a host in an Ethernet network may want to access various Web sites and Web pages contained on the Internet. To communicate with other types of networks, the host utilizes the Internet Protocol (IP) which allows hosts in many different types of networks to communicate with each other through IP packets. Within the Ethernet network, each host must be assigned an IP address by a network administrator for the purpose of communicating with computers outside the network via the Internet Protocol. Devices known as routers operate to forward IP packets from one network to another utilizing the IP addresses contained in the IP packets being communicated.

A router typically includes an access control list (ACL) to restrict or define the hosts with which a given host is allowed to communicate. For example, in an Ethernet network within a company, the hosts of employees may be restricted from communicating with certain Web sites. In this way, access control lists are utilized as a tool for network security to define or control the hosts and other objects, such as files and directories, with which a given host can communicate. For example, IP packets from a particular IP network or a particular Web site may be restricted from being received by hosts in the Ethernet network. In this situation, the access control list on the router would contain a field indicating that packets from the IP address corresponding to this Web site are to be denied, meaning that any such packets received by the router will not be forward to the intended host in the Ethernet network. IP packets include source and destination IP addresses, with the source IP address corresponding to the IP address of the host that sent the packet and the destination IP address corresponding to the host that is to receive the packet.

In an Ethernet network, there are two ways for a network administrator to assign IP addresses to hosts in the network. First, the network administrator can manually enter an IP address into a configuration file that is stored on each host. With large networks, this approach is typically not practical due to the amount of time it would take to configure all the hosts. As a result, the second approach that may be used is the configuration of a dynamic host configuration protocol (DHCP) server. The DHCP server operates to automatically assign IP addresses to hosts requesting an IP address instead of requiring the network administrator to manually assign such addresses. Typically, the DHCP server has a pool of available IP addresses that are assigned to requesting hosts as needed. When using a DHCP server to automatically assign IP addresses, the IP address for a given Ethernet host can change depending on the available IP addresses in the pool at the time the host requests the IP address. The use of a static ACL on a router to control access for a given Ethernet host does not work when a DHCP server is utilized since the IP address of the host is not static but changes over time. As a result, the static ACL having a set IP address for a given host does not allow the ACL to control access for that host when an IP address assigned to the host by the DHCP server is different than the IP address contained in the ACL.

In an Ethernet network, a user must typically log onto a host in the network to gain access to the network and other host coupled to the network. This is typically done through a centralized authentication server which authenticates the credentials of a particular user. For example, in a Microsoft Windows environment a Windows NT Domain Login is utilized to authenticate the credentials of a user before allowing that user access to the network via his host. A domain defines a group of computers and devices on a network that are administered as a unit with common rules and procedures, and a user provides a Windows NT Domain Login in the form of a user name and password to gain access to or log into the network. Another example is the login procedure utilized where an IEEE 802.11 wireless device wants to communicate with an Ethernet network. In this situation, the wireless device communicates login information to an Ethernet switch that also functions as an access point for the device to access the network, and the switch, in turn, communicates with a remote access and dial-in user service (RADIUS) server to verify the credentials of the user.

In some networks, there is no login procedure and user information is inferred directly from the MAC address of the host. Note that as used herein, the term host includes any type of electronic device that may be coupled to the network, such as a computer system, IP telephone, or personal digital assistant (PDA). For example, if a user "John Doe" has an IP telephone that begins sending Ethernet packets to the Ethernet network, then this IP telephone will be recognized using John Doe's Ethernet MAC address assigned to the telephone. A network administrator must configure the network in advance to define the MAC address for the IP telephone as a valid address within the network. Note that a user may log into the network on a number of different hosts and thus can have multiple MAC and IP addresses that will change as the user logs onto the network through different hosts. In many situations, access to resources within the network would ideally be restricted based upon user information regardless of the host through which the user is attempting to access the network.

In a network that communicates through the IP protocol, hosts are identified not only by their IP address but also by a "domain name" that is utilized instead of the IP address. As will be appreciated by those skilled in the art, a domain name such as "www.hp.com" may be registered with Internet domain name registration authorities to provide a plain English name that is easily remembered and recognized by users. Domain name system (DNS) servers contained in the Internet convert the domain name into a corresponding IP address which allows a host to communicate with a desired host corresponding to that IP address. There may be multiple IP addresses associated with a single domain name, and thus once again the use of a conventional ACL based upon a single IP address will not adequately restrict communication between a source host and destination host unless the ACL includes all such IP addresses. In the following description, the term "DNS name" will be used to refer to the domain name utilized by DNS servers and having an associated IP address, and the term "domain name" will be used to refer to groups of hosts in an Ethernet network that are administered as a unit such as a Windows NT domain name. Although the above examples are described with reference to an Ethernet network, the concepts of principles of the present invention may be applied to other types of networks, as will be appreciated by those skilled in the art.

There is a need for access control lists that allows access of hosts in a computer network such as an Ethernet network to be restricted or controlled based upon user names, MAC addresses, domain names, and DNS names instead of merely IP address information.

SUMMARY OF THE INVENTION

According to one aspect of the present invention, a method controls access of a user to a network including a plurality of hosts coupled together through a network switch. The method includes storing in the network switch an enhanced access control list containing data related to at least one of user names, DNS names, domain names, and physical addresses. A dynamic access control list is generated from the enhanced access control list, with the dynamic access control list containing a plurality of IP addresses that restrict access of the user to the network.

DETAILED DESCRIPTION OF PREFERRED EMBODIMENTS

Figure 1:
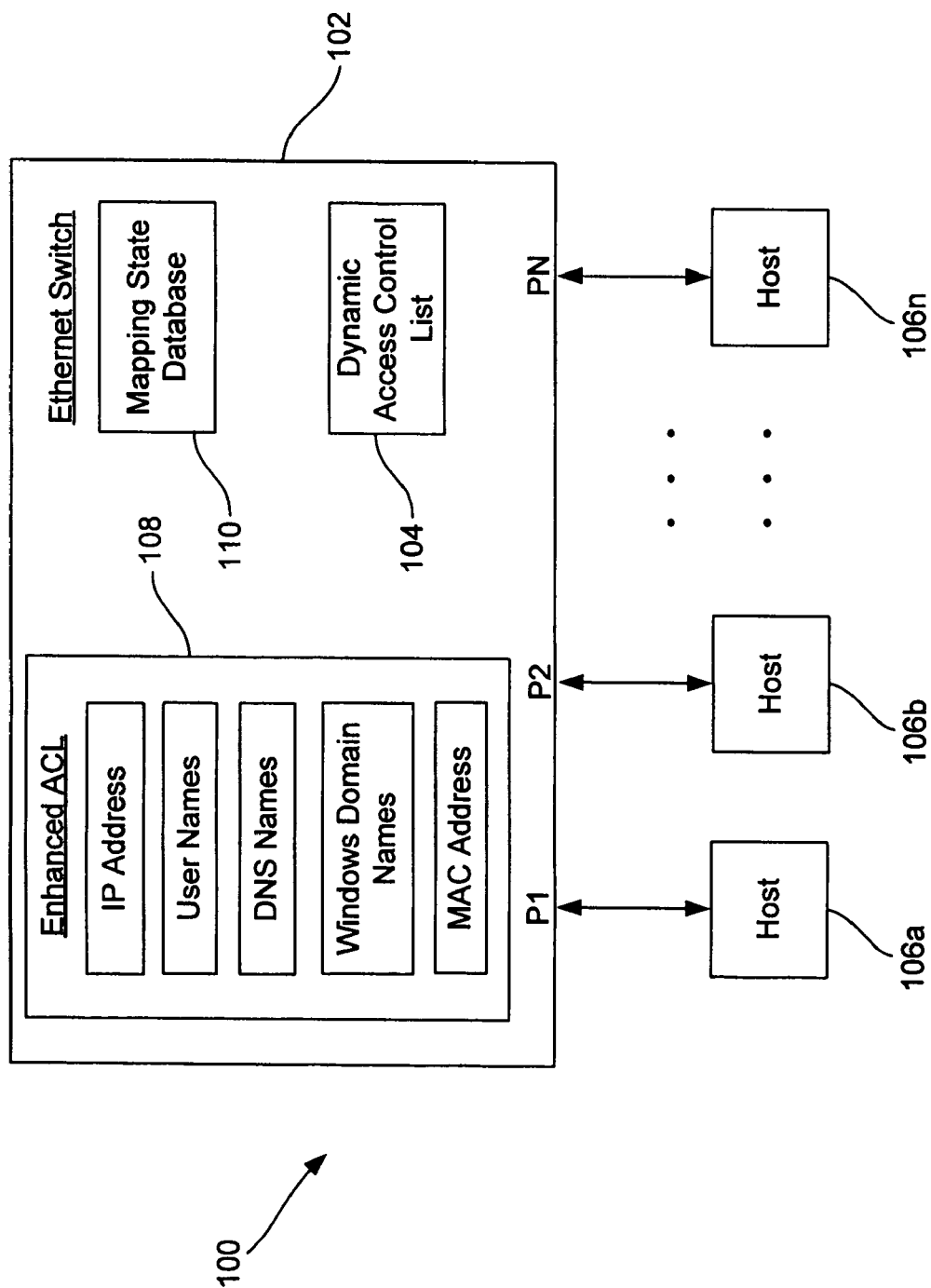
FIG. 1 is a functional block diagram of an Ethernet network including an Ethernet switch that utilizes a dynamic access control list to restrict the access of computers in the network according to one embodiment of the present invention.

FIG. 1 is a functional block diagram of an Ethernet network 100 including an Ethernet switch 102 that utilizes a dynamic access control list 104 to restrict the access of users to hosts 106a-n in the network according to one embodiment of the present invention. In operation, the switch 102 generates the dynamic access control list 104 containing IP addresses currently being utilized by various users of the network 100, and utilizes the dynamic access control list to restrict the access of such users to hosts 106a-n in the network. In generating the dynamic access control list, the switch 102 utilizes an enhanced access control list 108 containing IP address, user name, DNS name, Windows domain name, and MAC address information for the users and hosts 106a-n of the network 100. The switch 102 uses the information contained in the enhanced access control list 108 to determine current IP addresses for users accessing the network 100 and for hosts 106a-n requesting such IP address, and then stores the determined IP addresses in the dynamic access control list 104 to control the access of users and hosts to the network based upon the IP addresses in the dynamic access control list, as will be explained in more detail below.

In this way, the switch 102 allows user access to the network 100 to be controlled regardless of the host 106a-n through which the user is accessing the network and allows access to be controlled based upon IP address, user name, DNS name, Windows domain name, and/or MAC address information instead of merely static IP address information. Moreover, the switch 102 can be utilized in networks 100 containing a DHCP server (not shown) that dynamically allocates IP addresses to the hosts 106a-n since the dynamic access control list 104 will contain the current IP address assigned to each host by the DHCP server.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

In the network 100, the hosts 106a-n are coupled to ports P1-PN, respectively, of the Ethernet switch 102, and the switch forwards Ethernet packets from a source host (a host sending a packet) to a destination host (a host to which the packet is directed). More specifically, the switch 102 examines the destination MAC address portion of each received Ethernet packet and forwards the packet to the host 106a-n corresponding to the destination MAC address. This corresponds to the conventional operation of an Ethernet switch. In addition to the conventional operation of forwarding and receiving Ethernet packets, the switch 102 also determines whether each Ethernet packet is from a new host 106a-n on the port P1-PN. If the source MAC address of the new host is not in an address table of the switch 102, or is in the address table on a different port, the switch will recognize the new source MAC address.

The switch 102 also determines whether each Ethernet packet from a host 106a-n is a "login packet." Login packets are sent by a host 106a-n when a user is first attempting to access the network 100 through that host. Login packets convey the user name and password data for the user, and also includes the source MAC address of the host 106a-n the user is utilizing to access the network. A login request will be directed to an authentication server, which is not expressly shown in FIG. 1 but which corresponds to one of the hosts 106a-n. The switch 102 also detects the login acknowledge packets being returned from the authentication server for the originating host 106a-n in response to the login request. The switch 102 determines whether the user has been granted access from the login acknowledge packets, and if the user has been granted access the switch 102 associates the user name with the MAC address of the host 106a-n the user is utilizing. The switch 102 stores this association as an entry or record in a mapping state database 110, with the record containing the user name and the MAC address corresponding to the host 106*a-n* the user is currently using to access the network 100.

The switch 102 also detects all dynamic host configuration protocol (DHCP) packets sent by any of the hosts 106*a-n*. A host 106*a-n* sends DHCP packets to a DHCP server, which although not shown in FIG. 1, would correspond to one of the hosts to thereby obtain an IP address when required, such as when the host is going to access the Internet. The DHCP packets will contain a source MAC address corresponding to the host 106*a-n* that sent the DHCP packets and thus the host that is requesting the IP address. The switch 102 then monitors the return DHCP packets from the DHCP server sent in response to the DHCP packets, and from these return DHCP packets determines the IP address assigned to the host 106*a-n* requesting the IP address. At this point, the switch knows the IP address assigned to a particular MAC address.

Since prior to sending the DHCP packet the host 106*a-n* being used by the user would have previously sent a login packet, the mapping state database 110 will at this point contain a record indicating a user name associated with the MAC address of the host 106*a-n* that just requested the IP address. As a result, the switch 102 at this point has determined an IP address associated with a particular MAC address which, in turn, is associated with a particular user. The enhanced access control list 108 also includes rules or access privileges for each user (i.e., user name), and the switch 102 applies these rules to generate a corresponding entry or record in the dynamic access control list 104 for the user. The switch 102 thereafter applies the dynamic access control list 104 to control the access of the user to resources in the network 100, such as other hosts 106*a-n*, files, directories, Web sites, and so on.

As previously mentioned, the enhanced access control list 108 may include DNS names. The switch 102 uses such DNS names to generate additional IP address records in the dynamic access control list 104 to limit user access to specific Web sites, for example, as will be explained in more detail below. Briefly, the switch 102 uses the DNS name in the enhanced access control list 108 to obtain an IP address corresponding to the DNS name, and then utilizes this IP address in the dynamic access control list 104 to restrict a users access to the IP address corresponding to this DNS name. The same is true of Windows domain names contained in the enhanced access control list 108, as will also be explained in more detail below.

The switch 102 utilizes any IP addresses contained in the enhanced access control list 108 to generate corresponding entries in the dynamic access control list 104. Also note that the enhanced access control list need not include all of the indicated name and address information, but may include any subcombination of these information elements depending on the needs of the network 100. For example, the enhanced access control list 108 may include only IP address, MAC address, and user name information elements.

Figure 2:
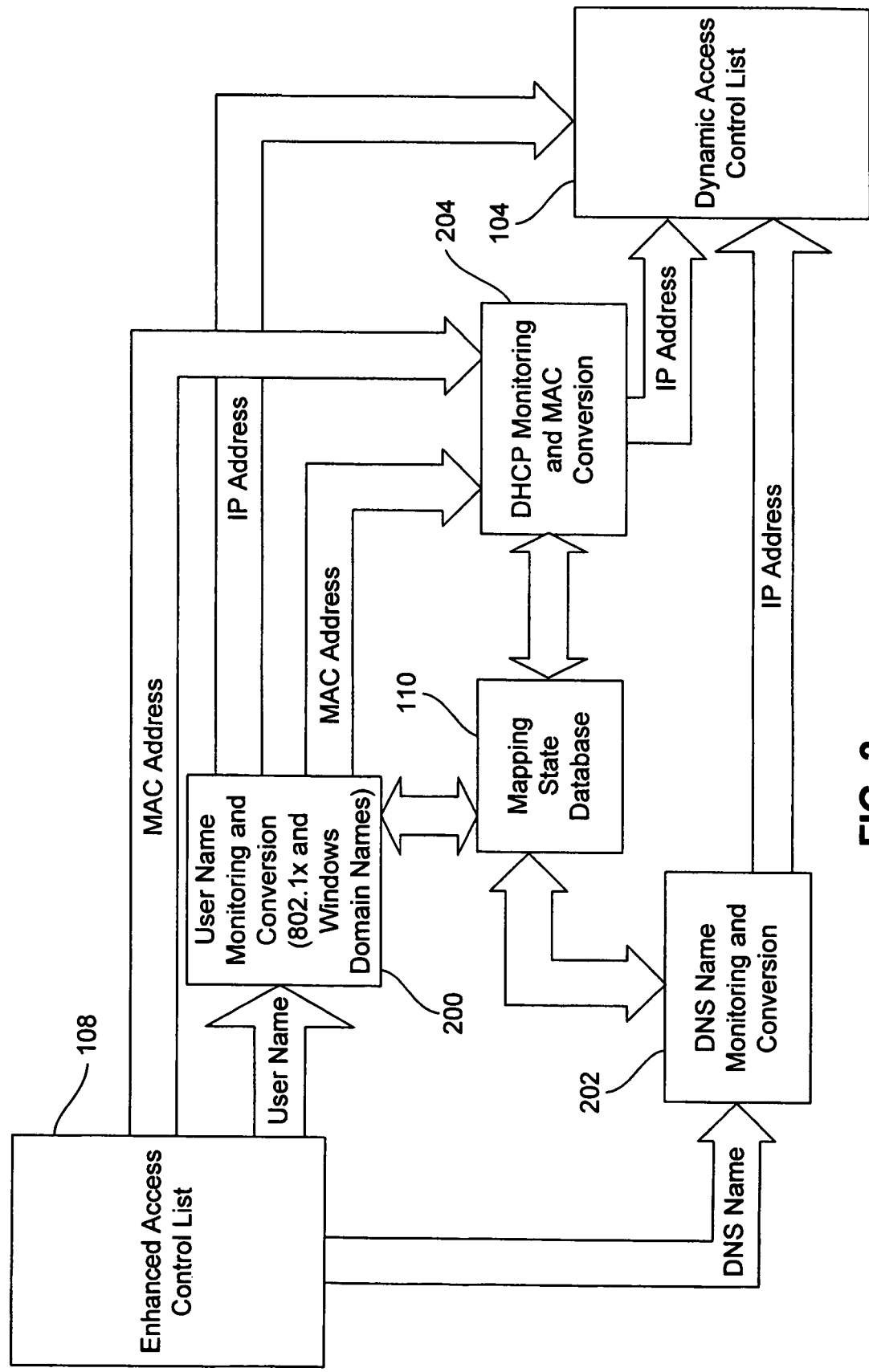
FIG. 2 is a functional flow diagram illustrating the process executed by the Ethernet switch of FIG. 1 in generating a dynamic access control list according to one embodiment of the present invention.

FIG. 2 is a functional flow diagram illustrating the process executed by the Ethernet switch 102 of FIG. 1 in generating the dynamic access control list 104 according to one embodiment of the present invention. The dynamic access control list 104, enhanced dynamic access control list 108, and mapping state database 110 previously discussed with reference to FIG. 1 are shown in FIG. 2. The overall process executed by the Ethernet switch 102 includes three subprocesses: 1) a user name monitoring and conversion subprocess 200; 2) a DNS name monitoring and conversion subprocess 202; and 3) a DHCP monitoring and MAC conversion subprocess 204. These subprocesses operate in combination to apply the rules contained in the enhanced access control list 108 to generate the mapping state database 110 and dynamic access control list 104, as will now be described in more detail.

In operation, the user name monitoring and conversion subprocess 200 converts user names into either MAC or IP addresses depending upon the manner in which a user is attempting to log into the network 100. When a user is attempting to log into the network 100 using a host 106 (FIG. 1) that communicates through the IEEE 802.1x standard, the host being utilized by the user will communicate login packets to the network 100. The IEEE 802.1x standard defines a group of communications protocols through which devices communicate with a local area network such as the network 100, as will be appreciated by those skilled in the art. The login packets will include a user name and password along with a MAC address associated with the host. 106 being utilized by the user. The subprocess 200 monitors a login reply packet sent by the network 100 to the host 106 being utilized by the user in response to the login packet to determine whether the user has been granted access to the network. When the subprocess 200 determines the user has been granted access, the subprocess associates the user name from the login packets with the MAC address of the host 106 being utilized by the user and stores this information as a record in the mapping state database 110. In this way, the subprocess 200 maps user names to MAC addresses when a user is accessing the network 100 with a host 106 that communicates via the IEEE 802.1x protocol. If the MAC address is new and thus not currently stored in the mapping state database 110, the subprocess 200 also supplies the MAC address to the DHCP monitoring and MAC conversion subprocess 204 for determination of the IP address associated with the new MAC address, as will be described in more detail below.

The user name monitoring and conversion subprocess 200 also operates to determine an IP address associated with a particular user name when a user is attempting to access the network 100 using a Windows host 106. More specifically, when hosts 106 in the network 100 run the Windows operating system, a Windows domain controller, which corresponds to one of the hosts, is responsible for granting or denying access of a user to the network. To access the network 100, a host 106 being utilized by the user and the host functioning as the domain controller communicate server message block (SMB) login packets. Each SMB login packet includes a user name associated with the user and a computer name associated with the host 106 being utilized by the user. In response to the SMB login packet, the domain controller will supply a SMB login reply packet to the host 106 being utilized by the user, and this packet will include an IP address assigned to the host being utilized by the user. This reply packet will also contain information either granting or denying the user access to the network 100. If the user is granted access to the network 100, the subprocess 200 will associate the IP address contained in the SMB login reply packet with the user name and apply the rules from the enhanced access control list 108 for this user name to generate corresponding records in the dynamic access control list 104. Note that if the presently determined IP address associated with the user name is different from an IP address for that user name previously stored in the dynamic access control list 104, both the new and the previous IP address(es) are stored for the user. This allows one Enhanced ACL entry to be created for the user, which is applied to all of the hosts 106 that the user has logged into, simultaneously.

It should be noted that the user name data contained in a SMB login packet is encrypted, and thus the subprocess 200 must have access to the corresponding encryption key in order to decrypt this data and obtain the user name. If the encryption key is not available, then the subprocess 200 could associate the computer name contained in the SMB login packet, which is not encrypted, with the IP address contained in the SMB login reply packet and store this information in the mapping state database 110.

The DNS name monitoring and conversion subprocess 202 operates to determine DNS names corresponding to IP addresses contained in packets being communicated over the network 100. More specifically, the subprocess 202 detects all Ethernet packets being communicated through the switch 102 (FIG. 1) having a source IP address which does not yet exist in the mapping state database 110. As will be appreciated by those skilled in the art, all packets being communicated over the network 100 are Ethernet packets when the network is an Ethernet network. In this situation, however, IP packets are contained within these Ethernet packets when the IP protocol is being utilized, with this nesting of packets of a particular protocol within packets of another protocol typically being referred to as a protocol stack, as will be understood by those skilled in the art. Accordingly, the subprocess 202 can detect all unknown source IP addresses contained in packets being communicated through the switch 102.

When the subprocess 202 detects an unknown source IP address, the subprocess generates a reverse DNS lookup query containing the source IP address, and sends this query to a DNS server. In response to the reverse DNS lookup query, the DNS server determines a DNS name corresponding to the source IP address and returns this DNS name to the switch 102. The subprocess 202 then stores the DNS name associated with this particular source IP address in the mapping state database 110 and applies the rules of the enhanced access control list 108 to develop a corresponding record for the dynamic access control list 104. It should be noted that there may be multiple records in the enhanced access control list 108 for a given DNS name. As a result, the subprocess 202 may develop a number of corresponding records for the dynamic access control list 104.

Over time new IP addresses may be assigned to particular DNS names and for proper operation of the switch. 102 the subprocess 202 must detect any such changes and properly update the dynamic access control list 104. This may be accomplished by the subprocess 202 occasionally sending reverse DNS lookup queries to the DNS server for each DNS name in the mapping state database 110 and detecting any changes. Another approach is to have the DNS server configured to automatically inform the subprocess 202 when a new IP address is assigned to a given DNS name, enabling the subprocess to update the dynamic access control list 104 as required.

The third subprocess executed by the switch 102 is the DHCP monitoring and MAC conversion subprocess 204, which converts MAC addresses into corresponding IP addresses. The subprocess 204 monitors DHCP return packets from a DHCP server, which corresponds to one of the hosts 106 (FIG. 1), and from these return packets determines the IP address assigned by the DHCP server to a given MAC address. Recall, in response to a request from a given host 106 the DHCP server assigns an IP addresses to that host from a pool of available IP addresses. Thus, the subprocess 204 need merely determine the assigned IP address contained in the return packet for the destination MAC address of the packet. The subprocess 204 stores a record of the IP address assigned to the MAC address in the mapping state database 110 and applies the rules of the enhanced access control list 108 to generate a corresponding record in the dynamic access control list 104.

If a prior IP address for the MAC address is already stored in the mapping state database 110, this record is deleted and updated with the new IP address and the dynamic access control list 104 updated accordingly. When MAC addresses are statically assigned to the hosts 106, the subprocess 204 monitors address resolution protocol (ARP) packets, where the ARP is a network protocol used to convert IP addresses into physical addresses such as Ethernet addresses, as will be understood by those skilled in the art. Each ARP packet will include the IP and MAC address of the host 106 sending the packet, and thus the subprocess 204 detects such packets to determine the IP address associated with each MAC address and updates the mapping state database 110 and dynamic access control list 104 accordingly. Alternatively, packets with new source IP addresses can be given to the CPU as was described in the DNS monitoring process. Through this method, the the IP and MAC address of the host 106 sending the packet is identified, and thus the subprocess 204 detects such packets to determine the IP address associated with each MAC address and updates the mapping state database 110 and dynamic access control list 104 accordingly During operation of the switch 102, it is possible that different user names or MAC addresses may attempt to be mapped to the same IP address, which should not be allowed and would represent an error condition. For example, assume a given host 106 has a MAC address "123456-123456" and has been statically assigned an IP address of 192.168.0.1. Also assume there is a rule in the enhanced access control list 108 for the MAC address 123456-123456. If there is a separate rule contained in the enhanced access control list 108 for a user "John Doe" and John Doe logs into the network using the host 106 corresponding to the MAC address 123456-123456 then the user name and John Doe and the MAC address 123456-123456 will mapped to the same IP address. This may not be a problem, but if John Doe has different access privileges to resources in the network 100 then does the MAC address 123456-123456 then a conflict and thus an error condition exists. For example, the access privileges of John Doe may be more restrictive than those of the MAC address 123456-123456, and in this situation and John Doe should not be provided access to the network 100 with the less restrictive access privileges associated with the MAC address.

Such a conflict may be resolved by generating a "deny" record in the dynamic access control list 104 for this IP address so that no packets are communicated to or from the host 106 corresponding to the IP address. Alternatively, the rule first encountered in the enhanced access control list 108 could be applied, such that if the rule for MAC address 123456-123456 appears in the enhanced access control list prior to the rule for user name and John Doe, the rule for the MAC address is utilized. In this way, as long as levels of access privileges are taken into account when generating the enhanced access control list 108 such conflicts can be resolved without denying all packets to and from the corresponding host 106. Furthermore, either of the above approaches could also include sending an error notification to a system administrator to notify him or her of the conflict.

Over time, the IP address configuration changes will occur on the network 100. For example, the administrator may reconfigure the DHCP server to allocate a different pool of IP addresses, or the network administrator may reconfigure hosts 106 with new static IP addresses. The DHCP server may allocate a different address to a given user. These IP address configuration changes could appear as an error condition. To prevent this, stale data must be purged from the mapping state database 110, and the associated entries in the Dynamic ACL 104 should be deleted. Mapping state database 110 entries populated via DHCP monitoring are deleted after a DHCP lease time expires, or when DHCP packets are received from the DCHP server which give a previously allocated IP address to a new user. Mapping state database 110 entries populated via ARP monitoring or IP source address change monitoring are deleted after an administratively configured time. One day is a good default value for this timeout.

Figure 3:
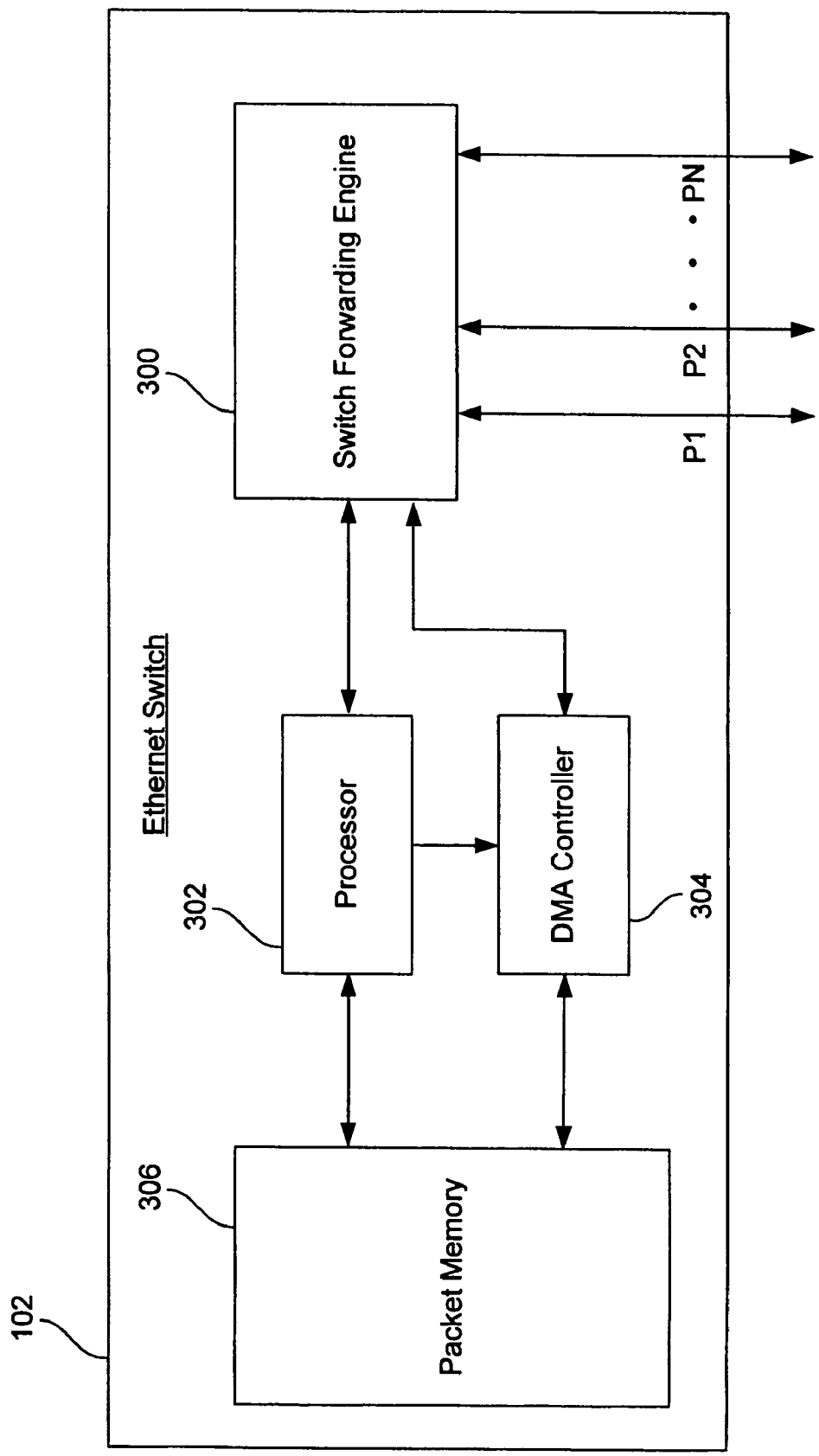
FIG. 3 is more detailed functional block diagram of the Ethernet switch of FIG. 1 according to one embodiment of the present invention.

FIG. 3 is more detailed functional block diagram of the Ethernet switch 102 of FIG. 1 according to one embodiment of the present invention. The Ethernet switch 102 includes a switch forwarding engine 300 that examines Ethernet packets received on one of a plurality of ports P1-PN from a host (not shown) coupled to each port and forwards each received Ethernet packet to the proper host through the corresponding port. A processor 302 in the switch 102 programs the switch forwarding engine 300 to execute a desired set of rules to provide selected Ethernet packets received by the forwarding engine to the processor. The set of rules ensures that the processor 302 receives all packets necessary for the proper generation of the dynamic access control list 104 (FIG. 2). In the embodiment of FIG. 3, the switch forwarding engine 300 provides all IEEE 802.1x login packets, Windows domain login packets, packets having unknown source IP addresses, and DHCP packets as previously described to the processor 302 to enable the processor execute the process previously described with reference to FIG. 2.

The switch 102 further includes a direct memory access (DMA) controller 304 that transfers the packets selected by the switch forwarding engine 300 to a packet memory 306. The selected packets are stored in the packet memory 306 for processing by the processor 302. Also stored in either the packet memory 306 or memory in the processor 302 is the enhanced access control list 108 (FIG. 2) along with required programming instructions for execution by the processor to control the overall operation of the switch 102. To store a selected packet from the switch forwarding engine 300, the processor 302 programs required registers in the DMA controller 304. The switch forwarding engine 300 then supplies the packet to the DMA controller 304 which, in turn, stores the packet in the packet memory 306. The processor 302 accesses the stored packets in the packet memory 306 along with the stored enhanced access control list 108 (FIG. 2) to generate the dynamic access control list 104 (FIG. 2). After the processor 302 processes a given packet stored in the packet memory 306, the packet may need to be provided to the intended destination host 106. To forward a packet stored in the packet memory 306 to the intended destination host 106, the processor 302 addresses the packet memory to access the desired packet and programs required registers in the DMA controller 304. In response to being programmed, the DMA controller 304 reads the accessed packets from the packet memory 306 and supplies these packets to the switch forwarding engine 300 which, in turn, forwards the packets to the required destination host 106.

One skilled in the art will understand that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. One skilled in the art will also appreciate that the functions performed by the dynamic access control list 104, enhanced access control list 108, mapping state database 110, subprocesses 200-204, and components 300-306 may be combined to be performed by fewer elements or divided out and performed by more elements, depending upon the specific application of the switch 102 and possibly other design considerations. Moreover, although the above embodiments have been described for the Ethernet network 100, the concepts of principles of the present invention may be applied to other types of networks, as will be appreciated by those skilled in the art. Therefore, the present invention is to be limited only by the appended claims.

What is claimed is:

1. A method of developing an access control list, comprising:
   developing an enhanced access control list including data related to at least one of user names, DNS names, Windows domain names, and physical addresses;
   converting, in a network switch, at least one of:
      user names into corresponding IP and physical addresses according to data in the enhanced access control list, wherein converting user names into corresponding IP and physical addresses according to data in the enhanced access control list includes:
         detecting login packets being communicated over the network;
         determining a MAC address from the login packets;
         detecting server message block login packets being communicated over the network;
         determining an IP address from the server message block login packets; and
         developing records in the access control list using the obtained IP address for the respective user name;
      DNS names into corresponding IP addresses according to data in the enhanced access control list; and
      physical addresses into IP addresses according to data in the enhanced access control list; and
   developing, in the network switch, the access control list from each of the operations of converting.

2. The method of claim 1 further comprising storing the user names and corresponding IP addresses in a mapping state database that defines current relationships among user names, DNS names, domain names, and physical addresses.

3. The method of claim 1 wherein each physical address comprises a MAC address.

4. The method of claim 1 wherein converting DNS names into corresponding IP addresses according to data in the enhanced access control list comprises:
   detecting packets having an unknown source IP address;
   generating a DNS name query using the source IP address;
   receiving a DNS name associated with the IP address responsive to the query; and
   developing records in the access control list using the obtained IP address for the respective DNS name.

5. The method of claim 4 further comprising occasionally generating new DNS name queries for the source IP address and thereafter repeating the operations of receiving and developing to update the access control list.

6. The method of claim 4 further comprising occasionally receiving the DNS name associated with the IP address and thereafter repeating the operation of developing to update the access control list.

7. The method of claim 1 wherein converting physical addresses into IP addresses according to data in the enhanced access control list comprises:
   monitoring DHCP packets communicated over the network;
   obtaining an IP address assigned to a particular physical address from the monitored DHCP packets; and developing records in the access control list using the obtained IP address assigned to a respective physical address.

8. A method of controlling access of a user to a network including a plurality of hosts coupled together through a network switch, the method comprising:
   storing in the network switch an enhanced access control list containing data related to at least one of user names, DNS names, Windows domain names, and physical addresses; and
   generating a dynamic access control list from the enhanced access control list, the dynamic access control list containing a plurality of IP addresses that restrict access of the user to the network, wherein generating the dynamic access control list comprises:
      mapping user names to IP addresses, wherein mapping user names to IP addresses comprises:
         detecting server message block login packets being communicated over the network; and
         determining an IP address from the server message block login packets;
      mapping user names to physical addresses;
      mapping physical addresses to IP addresses;
      mapping unknown IP addresses to physical addresses;
      mapping unknown IP addresses to DNS names; and
      applying rules set forth in the enhanced access control list relating to controlling access of a user to the addresses determined by the operations of mapping to generate the access control list.

9. The method of claim 8 wherein the physical addresses comprise MAC addresses.

10. The method of claim 8 wherein mapping user names to physical addresses comprises:
   detecting login packets being communicated over the network; and
   determining a MAC address from the login packets.

11. The method of claim 8 wherein mapping unknown IP addresses to DNS names comprises:
   detecting packets having an unknown source IP address;
   generating a DNS name query using the source IP address; and
   receiving a DNS name associated with the IP address responsive to the query.

12. The method of claim 11 further comprising occasionally generating new DNS name queries for the source IP address and thereafter repeating the operations of generating and receiving.

13. The method of claim 8 wherein mapping unknown IP addresses to physical addresses comprises detecting packets having an unknown source IP address.

14. The method of claim 8 wherein mapping physical addresses to IP addresses comprises:
   monitoring DHCP packets communicated over the network; and
   obtaining an IP address assigned to a particular physical address from the monitored DHCP packets.

15. A network switching circuit, comprising:
   a forwarding circuit operable to detect specific received packets and to provide the specific packets on a processor port, and further operable to receive packets on one of a plurality of ports including the processor port and to forward each received packet to a port corresponding to a destination address contained in the packet subject to access restrictions contained in a dynamic access control list;
   a memory circuit coupled to the forwarding circuit, the memory circuit operable to store packets and operable to store an enhanced access control list and a dynamic access control list; and
   a processor coupled to the forwarding circuit and to the memory circuit, the processor operable to define the specific packets detected by the forwarding circuit and operable to process the specific packets stored in the memory circuit using the enhanced access control list to generate the dynamic access control list and store the dynamic access control list in the memory circuit, and further operable to provide the specific packets to the processor port of the forwarding circuit after processing the packets.

16. The network switch of claim 15 wherein the processor further comprises a direct memory access controller coupled between the forwarding engine and the memory.

17. The network switch of claim 15 wherein the switch comprises an Ethernet switch and wherein the packets comprise Ethernet packets.

18. The network switch of claim 15 wherein the enhanced access control list comprises user names, DNS names, Windows domain names, and physical addresses.

19. A computer network, comprising:
   a network switch, including,
   a forwarding circuit operable to detect specific received packets and to provide the specific packets on a processor port, and further operable to receive packets on one of a plurality of ports including the processor port and to forward each received packet to a port corresponding to a destination address contained in the packet subject to access restrictions contained in a dynamic access control list;
   a memory circuit coupled to the forwarding circuit, the memory circuit operable to store packets and operable to store an enhanced access control list and a dynamic access control list; and
   a processor coupled to the forwarding circuit and to the memory circuit, the processor operable to define the specific packets detected by the forwarding circuit and operable to process the specific packets stored in the memory circuit using the enhanced access control list to generate the dynamic access control list and store the dynamic access control list in the memory circuit, and further operable to provide the specific packets to the processor port of the forwarding circuit after processing the packets; and
   a plurality of hosts, each host coupled to a respective port of the network switch.

20. The computer network of claim 19 wherein at least some of the hosts comprise personal computer systems.

21. The computer network of claim 19 wherein the network comprises an Ethernet network, and wherein the switch comprises an Ethernet switch and the packets comprise Ethernet packets.

22. The computer network of claim 19 wherein the enhanced access control list comprises user names, DNS names, Windows domain names, and physical addresses.

* * * * *